(12) United States Patent
Anegawa et al.

(10) Patent No.: US 11,951,676 B2
(45) Date of Patent: Apr. 9, 2024

(54) METHOD FOR MANUFACTURING MOLDING MOLD AND MOLDING MOLD

(71) Applicant: Seiko Epson Corporation, Tokyo (JP)

(72) Inventors: Kenta Anegawa, Matsumoto (JP); Tatsuya Tsuboi, Okaya (JP); Fumiaki Akahane, Matsumoto (JP); Yuka Wakuda, Chino (JP)

(73) Assignee: SEIKO EPSON CORPORATION (JP)

( * ) Notice: Subject to any disclaimer, the term of this patent is extended or adjusted under 35 U.S.C. 154(b) by 154 days.

(21) Appl. No.: 17/457,687

(22) Filed: Dec. 6, 2021

(65) Prior Publication Data

US 2022/0176620 A1    Jun. 9, 2022

(30) Foreign Application Priority Data

Dec. 7, 2020   (JP) ................. 2020-202747

(51) Int. Cl.
| | | |
|---|---|---|
| B29C 64/00 | (2017.01) | |
| B29C 33/38 | (2006.01) | |
| B29C 45/26 | (2006.01) | |
| B29C 64/118 | (2017.01) | |
| B29C 64/30 | (2017.01) | |
| B33Y 10/00 | (2015.01) | |
| B33Y 40/20 | (2020.01) | |
| B33Y 80/00 | (2015.01) | |
| B29K 505/12 | (2006.01) | |

(52) U.S. Cl.
CPC ........ B29C 64/118 (2017.08); B29C 33/3842 (2013.01); B29C 45/26 (2013.01); B29C 64/30 (2017.08); B33Y 10/00 (2014.12); B33Y 40/20 (2020.01); B33Y 80/00 (2014.12); B29K 2505/12 (2013.01)

(58) Field of Classification Search
CPC .............................. B29C 64/118; B33Y 10/00
See application file for complete search history.

(56) References Cited

U.S. PATENT DOCUMENTS

| | | | |
|---|---|---|---|
| 11,541,584 B1 * | 1/2023 | Quinonez | ........... B29C 45/2738 |
| 2009/0072436 A1 | 3/2009 | Dean | |
| 2012/0306125 A1 | 12/2012 | Dean | |
| 2015/0336298 A1 | 11/2015 | Dean | |
| 2017/0173695 A1 * | 6/2017 | Myerberg | ............. B29C 64/106 |
| 2017/0182680 A1 * | 6/2017 | England | ............. B29C 33/3842 |
| 2018/0304370 A1 * | 10/2018 | Myerberg | .......... G05B 19/4099 |
| 2019/0248069 A1 | 8/2019 | Anegawa et al. | |

FOREIGN PATENT DOCUMENTS

| | | | | |
|---|---|---|---|---|
| CN | 101456225 A | | 6/2009 | |
| CN | 102615820 A | | 8/2012 | |
| CN | 106009572 A | * | 10/2016 | ............. B33Y 70/00 |
| CN | 110154380 A | | 8/2019 | |
| JP | 2017-124593 A | | 7/2017 | |

* cited by examiner

*Primary Examiner* — Nicholas R Krasnow
(74) *Attorney, Agent, or Firm* — Harness, Dickey & Pierce, P.L.C.

(57) ABSTRACT

A method for manufacturing a molding mold used in an injection molding apparatus includes: generating a first plasticized material by plasticizing a first shaping material containing an amorphous metal and a resin; and shaping a laminate that is a part of the molding mold by discharging the first plasticized material toward a stage to laminate a layer.

13 Claims, 10 Drawing Sheets

| | PPS | Fe/PPS | | | | NAK | CF/PPS |
|---|---|---|---|---|---|---|---|
| | | 10 VOL% | 20 VOL% | 30 VOL% | 40 VOL% | | 30 MASS% |
| THERMAL CONDUCTIVITY [W/mK] | 0.19 | 0.335 | 0.508 | 0.566 | 0.618 | 39 | -- |
| ELASTIC MODULUS [GPa] PARALLEL | 3 | 3.7 | 4.9 | 6.3 | 7.9 | 201 | 9.2 |
| ELASTIC MODULUS [GPa] VERTICAL | 3 | 3.4 | -- | -- | 7.6 | 201 | 4.8 |

METHOD FOR MANUFACTURING MOLDING MOLD AND MOLDING MOLD

The present application is based on, and claims priority from JP Application Serial Number 2020-202747, filed Dec. 7, 2020, the disclosure of which is hereby incorporated by reference herein in its entirety.

BACKGROUND

1. Technical Field

The present disclosure relates to a method for manufacturing a molding mold and a molding mold.

2. Related Art

There is known an injection molding apparatus that supplies a material plasticized by a plasticizing device to a cavity provided in a molding mold to mold a molded product.

For example, JP-A-2017-124593 discloses that a molding mold of an injection molding apparatus is shaped using a three-dimensional shaping device. The three-dimensional shaping device can integrally shape a shape that cannot be formed in the related art. The molding mold of JP-A-2017-124593 is made of resin or metal.

However, for a molding mold made of resin, since thermal conductivity is low, heat is accumulated in the molding mold, and it takes time to cool the molding mold. On the other hand, for a molding mold made of metal, since thermal conductivity is high, the material is solidified before filling a cavity of the molding mold, and a filling failure is likely to occur. Further, a molded product molded by the molding mold is rapidly cooled and warpage is easily to occur.

SUMMARY

An aspect of the present disclosure is directed to a method for manufacturing a molding mold used in an injection molding apparatus, and the method includes: generating a first plasticized material by plasticizing a first shaping material containing an amorphous metal and a resin; and shaping a laminate that is a part of the molding mold by discharging the first plasticized material toward a stage to laminate a layer.

An aspect of the present disclosure is directed to a molding mold used in an injection molding apparatus, and the molding mold includes: a laminate containing an amorphous metal and a resin.

DESCRIPTION OF EXEMPLARY EMBODIMENTS

Hereinafter, preferred embodiments of the present disclosure will be described in detail with reference to drawings. The embodiments to be described below do not unduly limit contents of the present disclosure described in the claims. Further, all of configurations to be described below are not necessarily essential elements of the present disclosure.

1. First Embodiment

1.1. Injection Molding Apparatus

1.1.1. Overall Configuration

Figure 1:
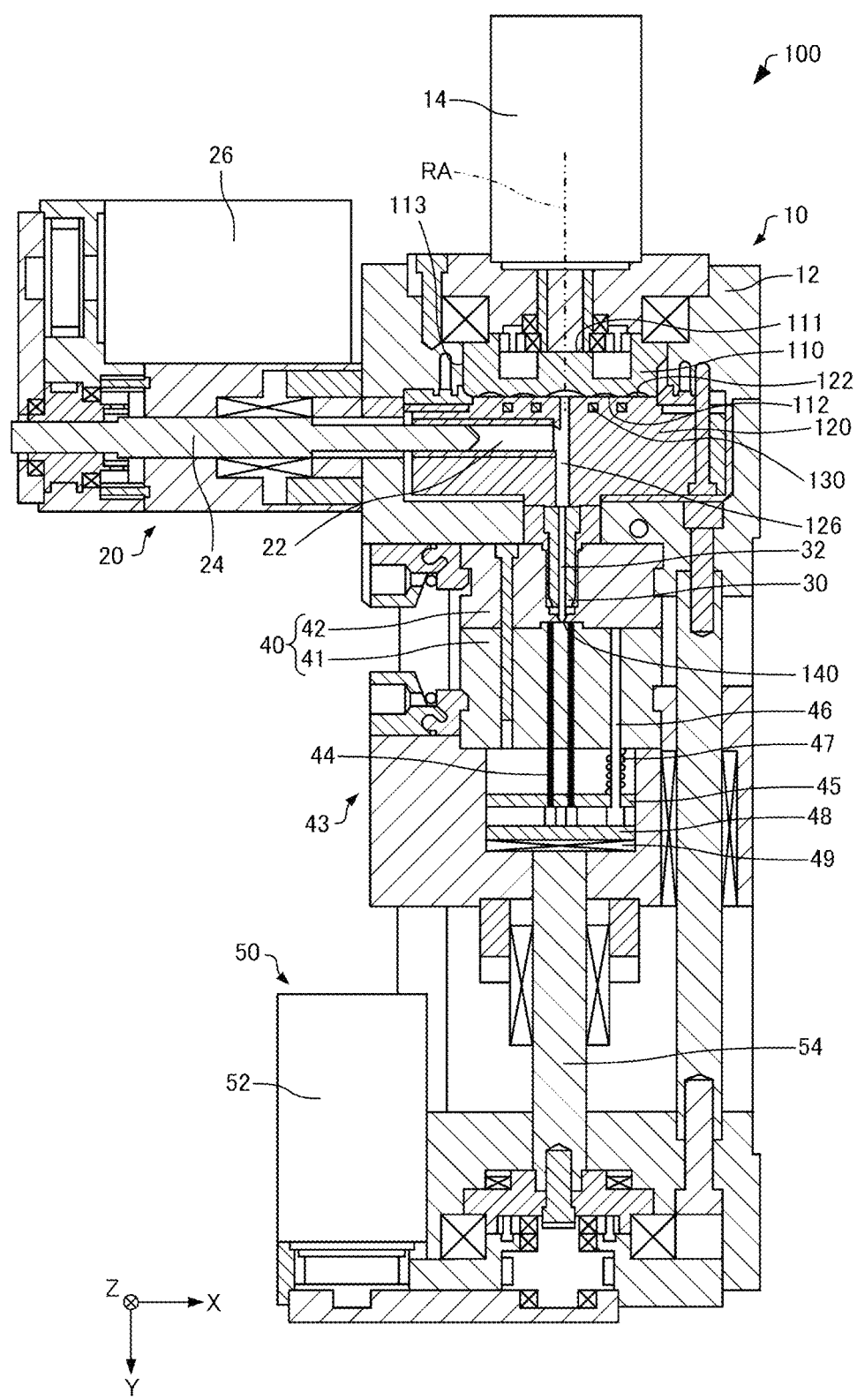
FIG. 1 is a cross-sectional view schematically showing an injection molding apparatus according to a first embodiment.

First, an injection molding apparatus according to a first embodiment will be described with reference to the drawings. FIG. 1 is a cross-sectional view schematically showing an injection molding apparatus 100 according to the first embodiment. FIG. 1 shows an X axis, a Y axis, and a Z axis as three axes orthogonal to one another.

Figure 2:
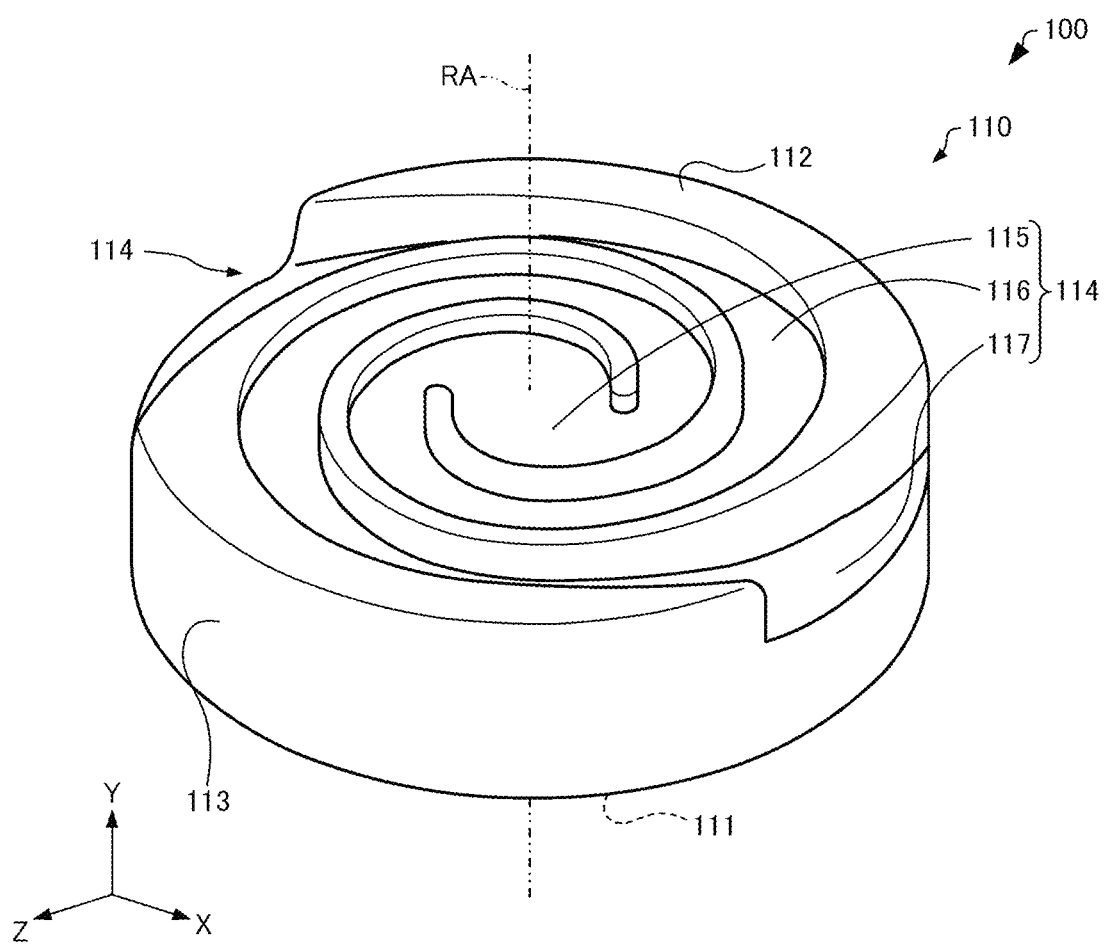
FIG. 2 is a perspective view schematically showing a flat screw of the injection molding apparatus according to the first embodiment.

As shown in FIG. 2, the injection molding apparatus 100 includes, for example, a plasticizing device 10, an injection mechanism 20, a nozzle 30, a molding mold 40, and a mold clamping device 50.

The plasticizing device 10 is configured to plasticize a supplied material, generate a paste plasticized material having fluidity, and guide the plasticized material to the injection mechanism 20.

The "plasticize" is a concept including melting, and means changing from a solid state to a flowable state. Specifically, for a material in which glass transition occurs, the "plasticize" refers to setting a temperature of the material to be equal to or higher than a glass transition point. For a material in which the glass transition does not occur, the "plasticize" refers to setting a temperature of the material to a temperature equal to or higher than a melting point.

The material supplied to the plasticizing device 10 is, for example, a resin. More specifically, examples of the material include ABS resin, polypropylene (PP), polyethylene (PE), polyacetal (POM), polyvinyl chloride (PVC), polyamide (PA), polylactic acid (PLA), polycarbonate (PC), modified polyphenylene ether, polybutylene terephthalate, polyethylene terephthalate, polysulfone, polyethersulfone, polyarylate, polyimide, polyamideimide, polyetherimide, or the like. A melting point of the material supplied to the plasticizing device 10 is lower than a melting point of the molding mold 40.

The plasticizing device 10 includes, for example, a screw case 12, a drive motor 14, a flat screw 110, a barrel 120, and a heater 130.

The screw case 12 is a housing that houses the flat screw 110. The flat screw 110 is housed in a space surrounded by the screw case 12 and the barrel 120.

The drive motor 14 is provided in the screw case 12. The drive motor 14 rotates the flat screw 110.

The flat screw 110 has a substantially cylindrical shape in which a size in a direction of a rotation axis RA is smaller than a size in a direction orthogonal to the direction of the rotation axis RA. In the illustrated example, the rotation axis RA is parallel to the Y axis. The flat screw 110 is rotated around the rotation axis RA by a torque generated by the drive motor 14. The flat screw 110 has a main surface 111, a groove forming surface 112 opposite to the main surface 111, and a coupling surface 113 coupling the main surface 111 and the groove forming surface 112. Here, FIG. 2 is a perspective view schematically showing the flat screw 110. For convenience, FIG. 2 shows a state in which an up-down positional relationship is reversed from a state shown in FIG. 1. Further, in FIG. 1, the flat screw 110 is shown in a simplified manner.

As shown in FIG. 2, first grooves 114 are formed in the groove forming surface 112 of the flat screw 110. The first groove 114 includes, for example, a central portion 115, a coupling portion 116, and a material introduction portion 117. The central portion 115 faces a communication hole 126 provided in the barrel 120. The central portion 115 communicates with the communication hole 126. The coupling portion 116 couples the central portion 115 and the material introduction portion 117. In the illustrated example, the coupling portion 116 is provided in a spiral shape from the central portion 115 toward an outer periphery of the groove forming surface 112. The material introduction portion 117 is provided on the outer periphery of the groove forming surface 112. That is, the material introduction portion 117 is provided on the coupling surface 113. The supplied material is introduced from the material introduction portion 117 into the first groove 114, passes through the coupling portion 116 and the central portion 115, and is conveyed to the communication hole 126 provided in the barrel 120. In the illustrated example, two first grooves 114 are provided.

The number of the first grooves 114 is not particularly limited. Although not illustrated, three or more first grooves 114 may be provided, or only one first groove 114 may be provided.

Figure 3:
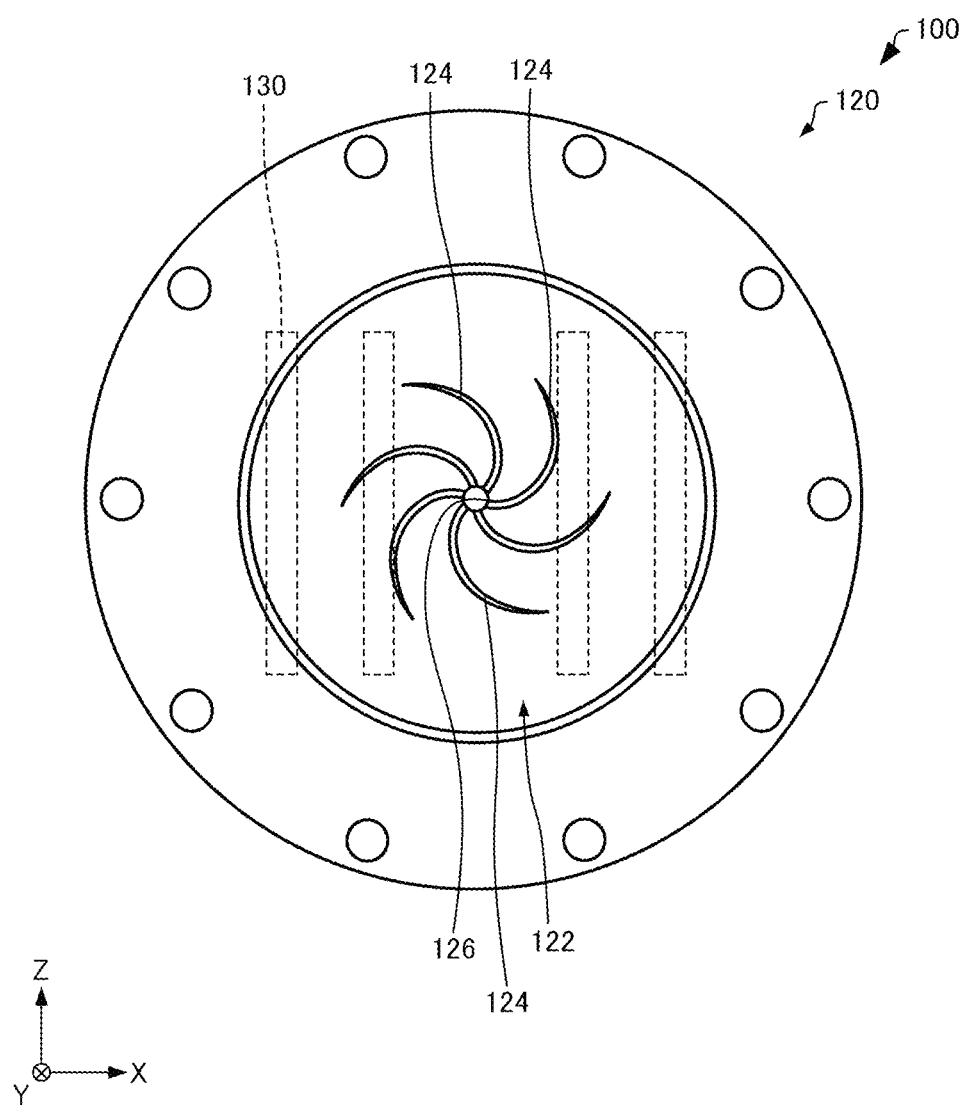
FIG. 3 is a view schematically showing a barrel of the injection molding apparatus according to the first embodiment.

As shown in FIG. 1, the barrel 120 is provided to face the flat screw 110. The barrel 120 has a facing surface 122 facing the groove forming surface 112 of the flat screw 110. The communication hole 126 is provided at a center of the facing surface 122. Here, FIG. 3 is a view schematically showing the barrel 120. For convenience, FIG. 1 shows the barrel 120 in a simplified manner.

As shown in FIG. 3, the facing surface 122 of the barrel 120 is provided with second grooves 124 and the communication hole 126. A plurality of the second grooves 124 are provided. In the illustrated example, six second grooves 124 are provided, but the number of second grooves 124 is not particularly limited. The plurality of second grooves 124 are provided around the communication hole 126 when viewed from the Y axis direction. The second grooves 124 are coupled to the communication hole 126 at respective one ends thereof, and extend spirally from the communication hole 126 toward an outer periphery of the facing surface 122. The second groove 124 has a function of guiding the plasticized material to the communication hole 126.

A shape of second groove 124 is not particularly limited, and may be, for example, a linear shape. Further, one end of the second groove 124 may not be coupled to the communication hole 126. Further, the facing surface 122 may not be provided with the second grooves 124. However, in consideration of efficiently guiding the plasticized material to the communication hole 126, the facing surface 122 is preferably provided with the second grooves 124.

The heater 130 is provided in the barrel 120. In the illustrated example, the heater 130 includes four rod heaters provided in the barrel 120. The heater 130 heats the material supplied between the flat screw 110 and the barrel 120. The plasticizing device 10 generates the plasticized material by the heater 130 heating the material while the flat screw 110 and the barrel 120 conveying the material toward the communication hole 126, and the generated plasticized material flows out from the communication hole 126 to the injection mechanism 20.

As shown in FIG. 1, the injection mechanism 20 includes, for example, a cylinder 22, a plunger 24, and a plunger drive unit 26. The cylinder 22 is a substantially cylindrical member coupled to the communication hole 126. The plunger 24 moves inside the cylinder 22. The plunger 24 is driven by the plunger drive unit 26 including a motor, a gear, or the like.

The injection mechanism 20 executes a metering operation and an injection operation by the plunger 24 sliding in the cylinder 22. The metering operation refers to an operation of guiding the plasticized material positioned in the communication hole 126 into the cylinder 22 by moving the plunger 24 in a −X axis direction away from the communication hole 126, and metering the plasticized material in the cylinder 22. The injection operation refers to an operation of injecting the plasticized material in the cylinder 22 into the molding mold 40 through the nozzle 30 by moving the plunger 24 in a +X axis direction to approach the communication hole 126.

The nozzle 30 is provided with a nozzle hole 32 communicating with the communication hole 126. The plasticized material supplied from the plasticizing device 10 is injected into the molding mold 40 via the nozzle hole 32. Specifically, the plasticized material metered in the cylinder 22 is sent from the injection mechanism 20 to the nozzle hole 32 through the communication hole 126 by executing the metering operation and the injection operation described above. Then, the plasticized material is injected into the molding mold 40 from the nozzle hole 32.

The molding mold 40 includes a movable mold 41 and a fixed mold 42. The movable mold 41 and the fixed mold 42 are provided to face each other. The molding mold 40 has a cavity 140 corresponding to a shape of the molded product between the movable mold 41 and the fixed mold 42. At least one of the movable mold 41 and the fixed mold 42 is provided with projection-recess that defines the cavity 140. The plasticized material flowing out from the communication hole 126 is pressure-fed by the injection mechanism 20 and injected from the nozzle 30 into the cavity 140. Details of the movable mold 41 and the fixed mold 42 will be described later.

The mold clamping device 50 includes a molding mold drive unit 52, and has a function of opening and closing the movable mold 41 and the fixed mold 42. The mold clamping device 50 rotates a ball screw 54 by driving the molding mold drive unit 52 implemented by a motor, and moves the movable mold 41, that is coupled to the ball screw 54, with respect to the fixed mold 42 to open and close the molding mold 40. The fixed mold 42 is stationary in the injection molding apparatus 100, and the movable mold 41 moves relatively to the stationary fixed mold 42 to open and close the molding mold 40.

The movable mold 41 is provided with an extrusion mechanism 43 for demolding the molded product from the molding mold 40. The extrusion mechanism 43 includes an ejector pin 44, a support plate 45, a support rod 46, a spring 47, an extrusion plate 48, and a thrust bearing 49.

The ejector pin 44 is a rod-shaped member for extruding the molded product molded in the cavity 140. The ejector pin 44 is provided to pass through the movable mold 41 to the cavity 140. The support plate 45 is a plate member that supports the ejector pin 44. The ejector pin 44 is fixed in the support plate 45. The support rod 46 is fixed to the support plate 45, and is inserted into a through hole provided in the movable mold 41. The spring 47 is disposed in a space between the movable mold 41 and the support plate 45, and the support rod 46 is inserted therein. The spring 47 biases the support plate 45 such that a head portion of the ejector pin 44 forms a part of a wall surface of the cavity 140 during molding. The extrusion plate 48 is fixed to the support plate 45. The thrust bearing 49 is attached to the extrusion plate 48. The thrust bearing 49 is provided to prevent a head portion of the ball screw 54 from damaging the extrusion plate 48. A thrust sliding bearing or the like may be used instead of the thrust bearing 49.

1.1.2. Molding Mold

Figure 4:
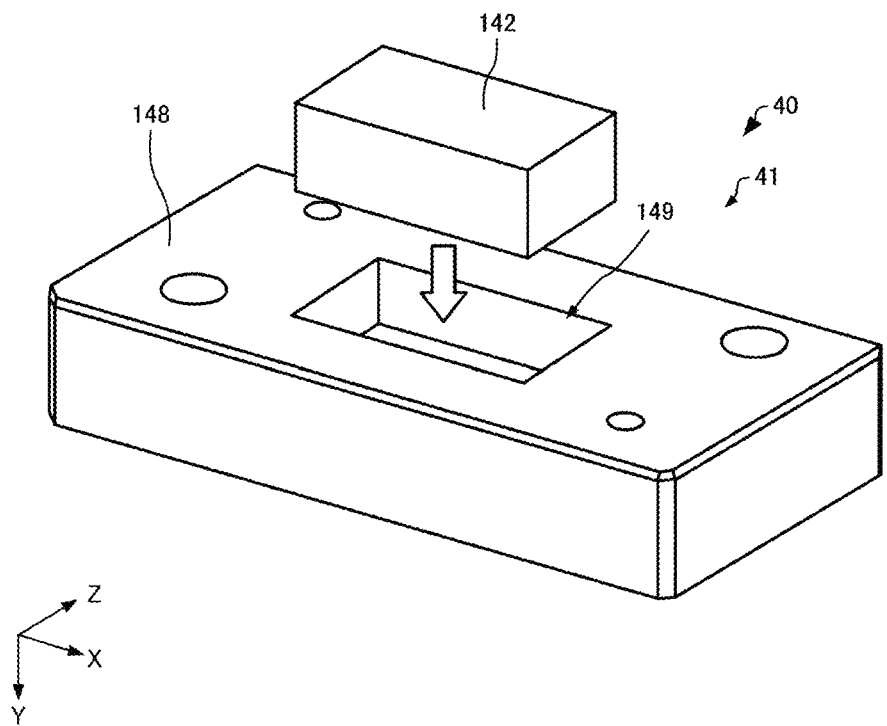
FIG. 4 is an exploded perspective view schematically showing a molding mold according to the first embodiment.
Figure 5:
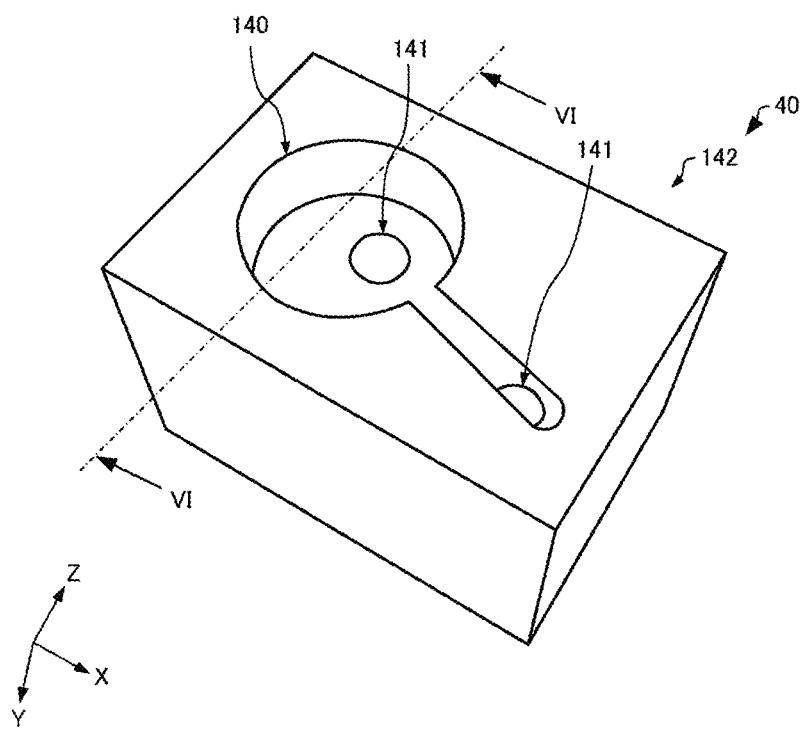
FIG. 5 is a perspective view schematically showing the molding mold according to the first embodiment.
Figure 6:
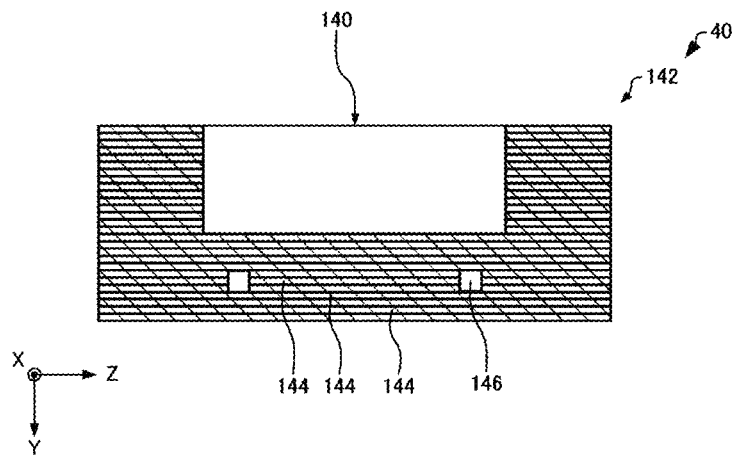
FIG. 6 is a cross-sectional view schematically showing the molding mold according to the first embodiment.

FIG. 4 is an exploded perspective view schematically showing the molding mold 40. FIG. 5 is a perspective view schematically showing a laminate 142 of the molding mold 40. FIG. 6 is a cross-sectional view taken along a line VI-VI of FIG. 5 schematically showing the laminate 142 of the molding mold 40.

As shown in FIGS. 4 to 6, the movable mold 41 of the molding mold 40 includes the laminate 142 and a master mold 148. For convenience, in FIG. 4, the laminate 142 is illustrated in a simplified manner. Further, for convenience, the fixed mold 42 of the molding mold 40 is not shown in FIGS. 4 to 6. The molding mold 40 is a molding mold used in the injection molding apparatus 100.

As shown in FIG. 4, the molding mold 40 is formed by fitting the laminate 142 into a recess portion 149 provided in the master mold 148. A material of the master mold 148 is, for example, metal.

As shown in FIG. 6, the laminate 142 includes a plurality of layers 144. The laminate 142 is formed by laminating the plurality of layers 144. The number of the plurality of layers 144 is not particularly limited. The laminate 142 is a core.

The laminate 142 has the cavity 140. A shape of the cavity 140 corresponds to the shape of the molded product molded by the injection molding apparatus 100. The cavity 140 is defined by the laminate 142. As shown in FIG. 5, a through hole 141 into which the ejector pin 44 is inserted is provided in a bottom surface of the cavity 140. In the illustrated example, two through holes 141 are provided.

As shown in FIG. 6, the laminate 142 includes a cooling pipe 146. In the illustrated example, the cooling pipe 146 is provided in a +Y axis direction of the cavity 140. Refrigerant for cooling the molded product flows through the cooling pipe 146. Examples of the refrigerant include water.

The laminate 142 contains an amorphous metal and a resin. The amorphous metal is a non-crystalline metal.

A main component of the amorphous metal contained in the laminate 142 is, for example, iron (Fe), cobalt (Co), nickel (Ni). The "main component of the amorphous metal" is a component having a content of 70% by mass or more in the amorphous metal. In the amorphous metal, tungsten (W), niobium (Nb), tantalum (Ta), titanium (Ti), zirconium (Zr), hafnium (Hf), or the like may be added to the main component described above.

Examples of the resin contained in the laminate 142 include polyphenylene sulfide (PPS), ABS resin, polypropylene (PP), polyethylene (PE), polyacetal (POM), polyvinyl chloride (PVC), polyamide (PA), polylactic acid (PLA), polycarbonate (PC), modified polyphenylene ether, polybutylene terephthalate, polyethylene terephthalate, polysulfone, polyethersulfone, polyarylate, polyimide, polyamideimide, polyetherimide, polyether ether ketone (PEEK), or the like.

Figure 7:
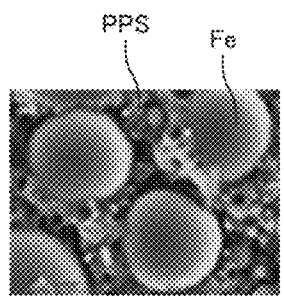
FIG. 7 is an SEM image of a laminate.

Here, FIG. 7 is a scanning electron microscope (SEM) image of the laminate 142. In the laminate 142 shown in FIG. 7, Fe is used as the amorphous metal, and PPS is used as the resin. As shown in FIG. 7, the amorphous metal is spherical. The amorphous metal contained in the laminate 142 is formed by an atomization method. The spherical amorphous metal can be obtained by the atomization method.

A particle size of the amorphous metal contained in the laminate 142 is, for example, 5 μm or more and 100 μm or less, preferably 10 μm or more and 50 μm or less, and more preferably 20 μm or more and 30 μm or less. The particle size of the amorphous metal is measured by, for example, a SEM.

A content of the amorphous metal in the laminate 142 is, for example, 1 vol % or more and 40 vol % or less, and preferably 10 vol % or more and 40 vol % or less.

Thermal conductivity of the laminate 142 is, for example, 0.20 W/mK or more and 10.0 W/mK or less, and is preferably 0.30 W/mK or more and 0.80 W/mK or less. The thermal conductivity of the laminate 142 can be estimated based on a temperature difference and a heat flux amount of the laminate 142, for example, as in an experimental example described below.

An elastic modulus difference ratio of the laminate 142 is, for example, 80% or more and 120% or less, and preferably 90% or more and 110% or less. An elastic modulus difference ratio R of the laminate 142 can be calculated by the following Formula (1), in which an elastic modulus of the laminate 142 in a first direction is $E_1$ (GPa) and an elastic modulus of the laminate 142 in a second direction orthogonal to the first direction is $E_2$ (GPa).

$$R = E_1/E_2 \times 100 \tag{1}$$

The elastic moduli $E_1$ and $E_2$ are measured based on, for example, "JIS K7171". For example, the first direction is the X axis direction, and the second direction is the Z axis direction.

1.2. Method for Manufacturing Molding Mold

Figure 8:
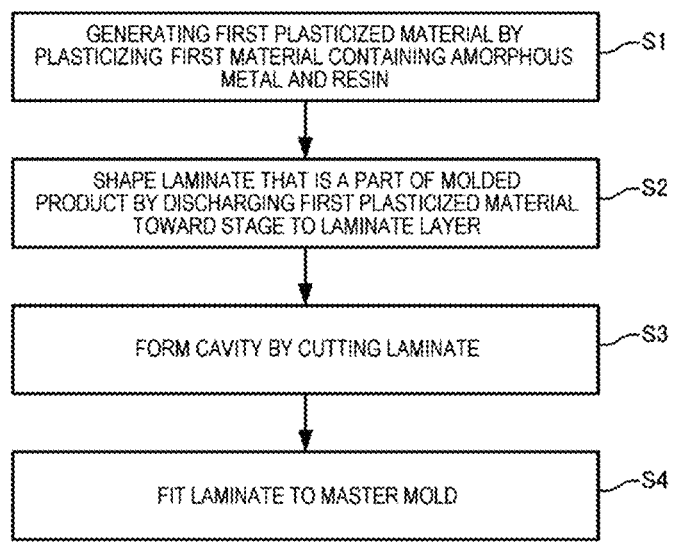
FIG. 8 is a flowchart for showing a method for manufacturing a molding mold according to the first embodiment.

Next, a method for manufacturing the molding mold 40 according to the first embodiment will be described with reference to the drawings. FIG. 8 is a flowchart showing the method for manufacturing the molding mold 40 according to the first embodiment.

First, as shown in FIG. 8, in step S1, a first shaping material containing an amorphous metal and a resin is plasticized to generate a first plasticized material. The first shaping material contains the amorphous metal and the resin contained in the laminate 142 described above. A content of the amorphous metal in the first shaping material is, for example, 1 vol % or more and 40 vol % or less, and preferably 10 vol % or more and 40 vol % or less. The first shaping material is formed by, for example, kneading the amorphous metal and the resin with a twin-screw extruder. In the step of generating the first plasticized material, for example, the flat screw is used to generate the first plasticized material as described later.

The first shaping material may contain ceramics, a solvent, a binder, or the like in addition to the amorphous metal and the resin.

Next, in step S2, the first plasticized material is discharged toward a stage to laminate the layers 144, thereby shaping the laminate 142 that is a part of the molding mold 40. In the step of shaping the laminate 142, for example, the laminate 142 having the cooling pipe 146 is shaped.

Next, in step S3, the cavity 140 is formed by cutting the laminate 142. The cutting of the laminate 142 is performed using, for example, a cutting tool as will be described later. In the step of shaping the laminate 142 in step S2, the cavity 140 may be formed. In this case, step S3 may be omitted.

Next, in step S4, as shown in FIG. 4, the laminate 142 is fitted to the master mold 148.

The molding mold 40 can be manufactured by the above steps.

Figure 9:
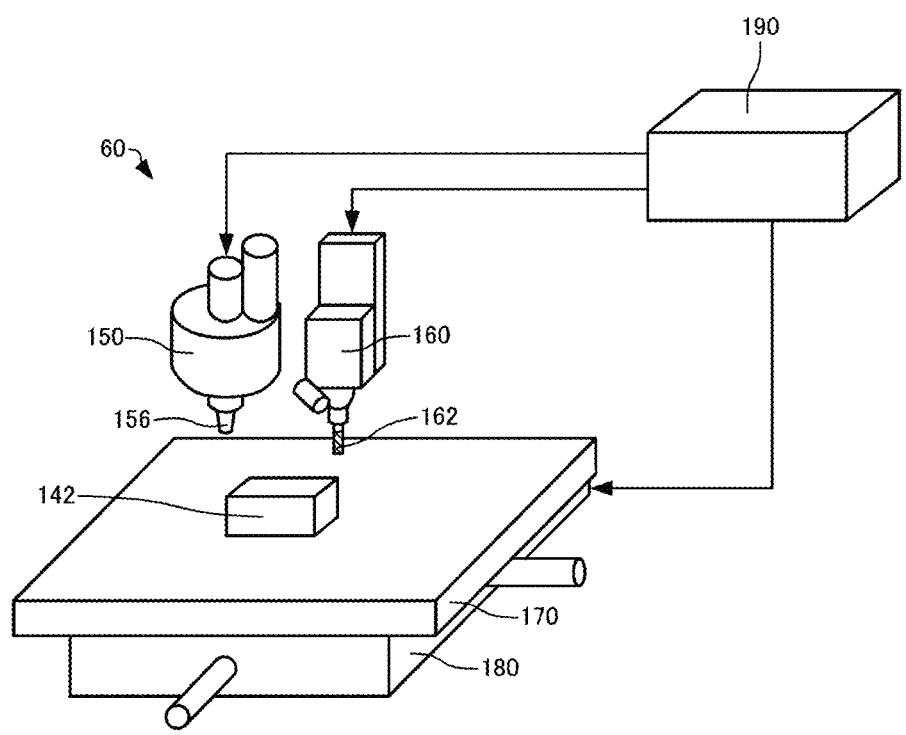
FIG. 9 is a perspective view schematically showing a three-dimensional shaping device used in the method for manufacturing a molding mold according to the first embodiment.

1.3. Three-Dimensional Shaping Device Used in Method for Manufacturing Molding Mold The method for manufacturing the molding mold 40 is performed using a three-dimensional shaping device. FIG. 9 is a diagram schematically showing a three-dimensional shaping device 60 used in the method for manufacturing the molding mold 40. The three-dimensional shaping device 60 shapes the laminate 142 that is a part of the molding mold 40.

As shown in FIG. 9, the three-dimensional shaping device 60 includes a shaping unit 150, a cutting unit 160, a stage 170, a moving mechanism 180, and a control unit 190.

The three-dimensional shaping device 60 drives the moving mechanism 180 to change a relative position between a nozzle 156 of the shaping unit 150 and the stage 170 while discharging the first plasticized material from the nozzle 156 onto the stage 170. Accordingly, the shaping unit 150 laminates the laminate 142 on the stage 170. For convenience, in FIG. 9, the laminate 142 is illustrated in a simplified manner.

Further, the three-dimensional shaping device 60 drives the moving mechanism 180 to change a relative position between a cutting tool 162 of the cutting unit 160 and the stage 170 while rotating the cutting tool 162. Accordingly, the cutting unit 160 cuts the laminate 142 laminated on the stage 170. Thus, the three-dimensional shaping device 60 shapes the laminate 142 of a desired shape.

Figure 10:
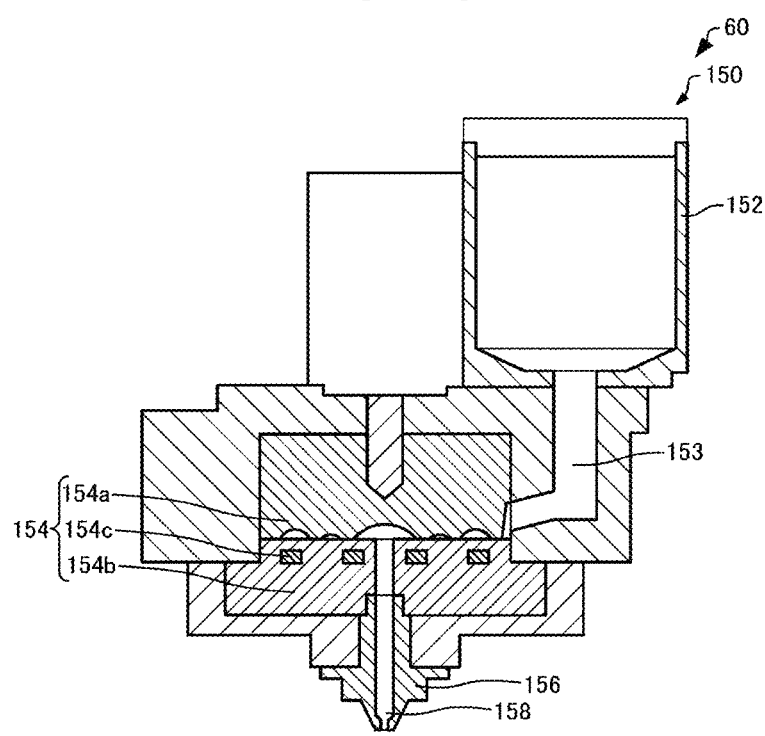
FIG. 10 is a cross-sectional view schematically showing a shaping unit of the three-dimensional shaping device used in the method for manufacturing a molding mold according to the first embodiment.

Here, FIG. 10 is a cross-sectional view schematically showing the shaping unit 150. As shown in FIG. 10, the shaping unit 150 includes, for example, a material supply unit 152, a plasticizing unit 154, and the nozzle 156.

The material supply unit 152 supplies the first shaping material to the plasticizing unit 154. The first shaping material in a pellet form or a powder form is supplied to the material supply unit 152. The material supply unit 152 is implemented by, for example, a hopper. The material supply unit 152 and the plasticizing unit 154 are coupled by a supply path 153 provided below the material supply unit 152. The first shaping material supplied to the material supply unit 152 is supplied to the plasticizing unit 154 via the supply path 153.

The plasticizing unit 154 has the same configuration as the plasticizing device 10 of the injection molding apparatus 100 shown in FIG. 1. That is, the plasticizing unit 154 includes a flat screw 154a, a barrel 154b, and a heater 154c. The plasticizing unit 154 plasticizes the first shaping material supplied from the material supply unit 152 to generate paste first plasticized material having fluidity, and guides the first plasticized material to a nozzle hole 158 provided in the nozzle 156.

The first plasticized material generated by the plasticizing unit 154 is discharged via the nozzle 156 toward the stage 170.

As shown in FIG. 9, the cutting unit 160 is a device that rotates the cutting tool 162 attached to a tip portion on a stage 170 side to cut the laminate 142 laminated on the stage 170. The cutting unit 160, for example, cuts the laminate 142 to form the cavity 140. As the cutting tool 162, for example, a flat end mill or a ball end mill is used. The control unit 190 controls the moving mechanism 180 to change a relative position between the cutting tool 162 and the laminate 142 laminated on the stage 170, thereby controlling a cutting position.

The laminate 142 is laminated on the stage 170. In the illustrated example, the laminate 142 is directly provided on the stage 170. Although not illustrated, the laminate 142 may be provided on the stage 170 via a base plate. Then, the molding mold 40 may be manufactured by fitting the laminate 142 and the base plate to the master mold 148.

The moving mechanism 180 supports the stage 170. In the illustrated example, the moving mechanism 180 is implemented as a three-axis positioner that moves the stage 170 along three axes orthogonal to one another with respect to the shaping unit 150 and the cutting unit 160.

The moving mechanism 180 may move the shaping unit 150 and the cutting unit 160 with respect to the stage 170 instead of moving the stage 170. Further, the moving mechanism 180 may move both the stage 170, and the shaping unit 150 and the cutting unit 160. The moving mechanism 180 may have a function of inclining the stage 170 with respect to a horizontal plane. The moving mechanism 180 may have a function of inclining the nozzle 156 and the cutting tool 162.

The control unit 190 is implemented by, for example, a computer including a processor, a main storage device, and an input and output interface through which a signal is input from and output to the outside. The control unit 190 controls the shaping unit 150, the cutting unit 160, and the moving mechanism 180, for example, by the processor executing a program read into the main storage device. The control unit 190 may be implemented by a combination of a plurality of circuits instead of a computer.

Figure 11:
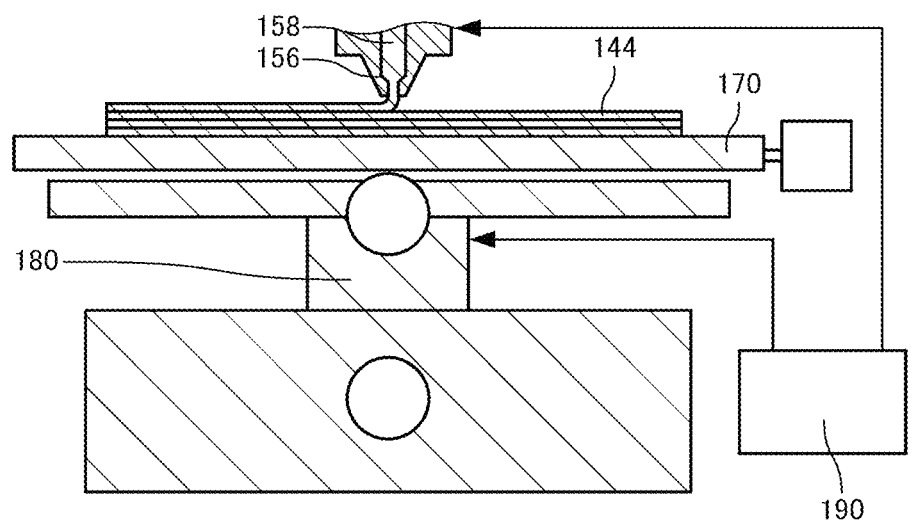
FIG. 11 is a cross-sectional view schematically showing a manufacturing process of the molding mold according to the first embodiment.

Here, FIG. 11 is a cross-sectional view schematically showing a manufacturing process of the laminate 142 in the three-dimensional shaping device 60.

As shown in FIG. 11, the control unit 190 causes the first plasticized material to be discharged from the nozzle 156 while changing the position of the nozzle 156 with respect to the stage 170 in a direction along an upper surface of the stage 170 in a state of maintaining a distance between the stage 170 and the nozzle 156. The first plasticized material discharged from the nozzle 156 is continuously deposited on the stage 170 in a moving direction of the nozzle 156, and the layer 144 is formed.

The control unit 190 repeats scanning of the nozzle 156 to form a plurality of the layers 144. Specifically, after forming one layer 144, the control unit 190 moves the position of the nozzle 156 upward with respect to the stage 170. Then, the laminate 142 is shaped by further stacking the layer 144 on the layer 144 formed so far.

The control unit 190 may temporarily interrupt the discharge of the first shaping material from the nozzle 156, for example, when the nozzle 156 is moved upward after one layer 144 is deposited, or when a discontinuous path is shaped. In this case, the control unit 190 controls a butterfly valve (not shown) or the like provided in the nozzle hole 158 to stop the discharge of the first plasticized material from the nozzle 156. After changing the position of the nozzle 156, the control unit 190 opens the butterfly valve to resume the discharge of the first plasticized material, thereby resuming the deposition of the first plasticized material from a position of the nozzle 156 that was changed.

1.4. Function and Effect

The method for manufacturing the molding mold 40 includes the step of generating the first plasticized material by plasticizing the first shaping material containing the amorphous metal and the resin, and the step of shaping the laminate 142 that is a part of the molding mold 40 by discharging the first plasticized material toward the stage 170 to laminate the layer 144. The amorphous metal has thermal conductivity lower than that of the metal and higher than that of the resin. Therefore, the molding mold 40 can be manufactured in which heat accumulated in the laminate 142 is reduced, a cooling time of a molded product is shortened, and a filling failure and warpage are less likely to occur in the molded product.

In the method for manufacturing the molding mold 40, the amorphous metal is spherical. Therefore, as compared with when the amorphous metal is not spherical, it is possible to manufacture the laminate 142 having a small elastic modulus difference in the first direction and the second direction orthogonal to each other. Accordingly, a mechanical characteristic of the laminate 142 can be stabilized. Further, a degree of freedom in design can be increased.

In the method for manufacturing the molding mold 40, the content of the amorphous metal in the first shaping material is 1 vol % or more and 40 vol % or less. Therefore, the thermal conductivity of the laminate 142 is set to be lower than the thermal conductivity of the metal and higher than the thermal conductivity of the resin, and the laminate 142 can be easily shaped by the three-dimensional shaping device 60. When the content of the amorphous metal in the first shaping material is more than 40 vol %, it is difficult to mold the laminate by the three-dimensional shaping device. However, if a device is devised, a laminate in which a content of the amorphous metal is up to 80% can be manufactured.

In the method for manufacturing the molding mold 40, the main component of the amorphous metal is iron, and the particle size of the amorphous metal is 5 μm or more and 100 μm or less. When the particle size of the amorphous metal is 5 μm or more, the laminate 142 can have high rigidity. Further, it is difficult to manufacture an amorphous metal having a particle size of less than 5 μm. When the particle size of the amorphous metal is 100 μm or less, the possibility of the amorphous metal spilling off when the laminate 142 is cut can be reduced.

In the method for manufacturing the molding mold 40, in the step of generating the first plasticized material, the first plasticized material is generated using the flat screw 154a. Therefore, for example, as compared with when the first plasticized material is generated using an in-line screw, the three-dimensional shaping device 60 for manufacturing the laminate 142 can be reduced in size. If the size of the device is not taken into consideration, the first plasticized material may be generated using the in-line screw.

The method for manufacturing the molding mold 40 includes the step of forming the cavity 140 by cutting the laminate 142. Therefore, since the cavity 140 is not formed in the step of shaping the laminate 142, the step of shaping the laminate 142 can be simplified.

The cavity 140 may be formed in the step of shaping the laminate 142. In this case, since the cavity 140 is not formed by cutting the laminate 142, the cutting process can be simplified or the cutting process can be omitted.

In the method for manufacturing the molding mold 40, the laminate 142 having the cooling pipe 146 is shaped in the step of shaping the laminate 142. Therefore, the cooling time of the molded product can be further shortened.

2. Second Embodiment

2.1. Molding Mold

Figure 12:
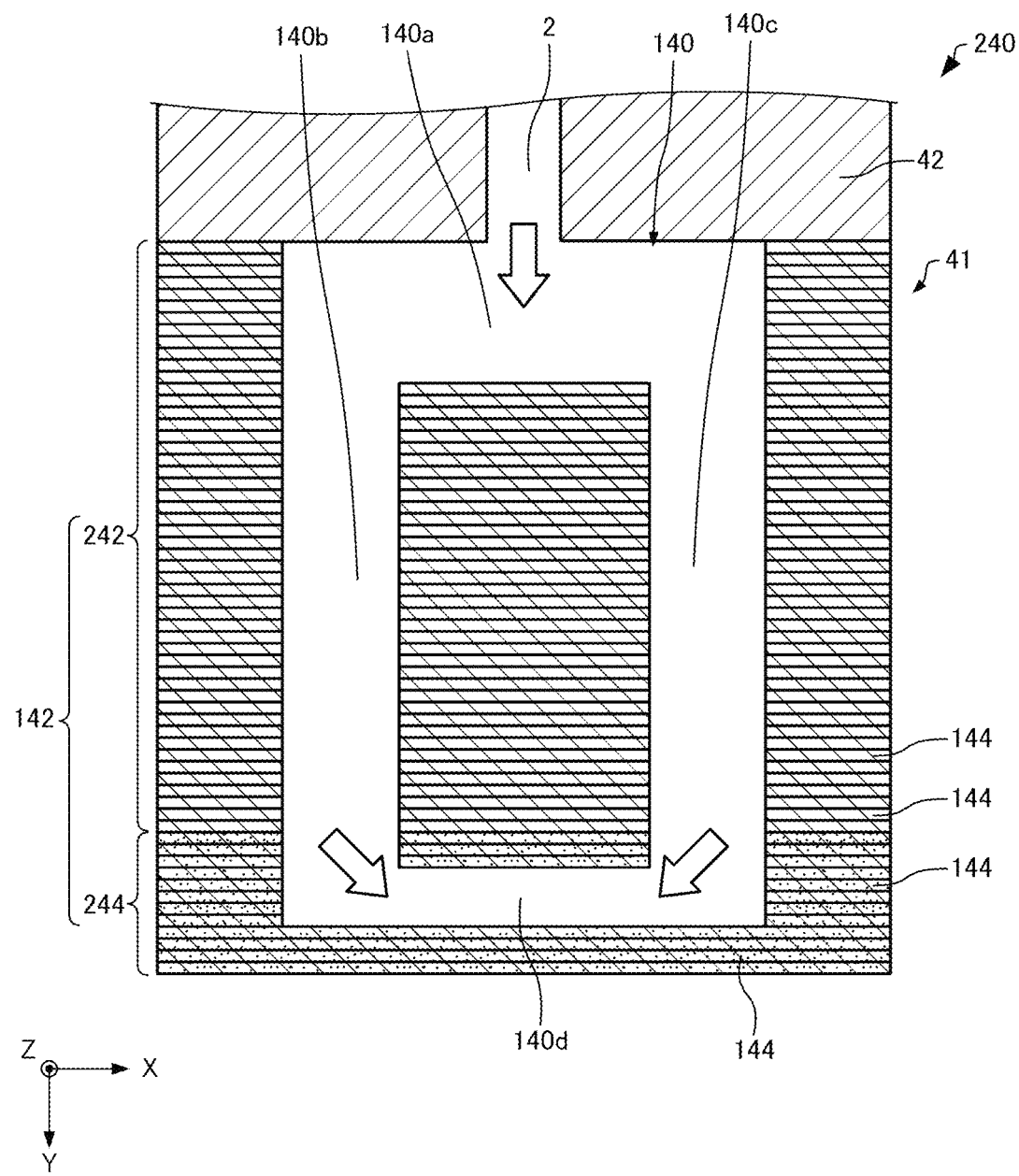
FIG. 12 is a cross-sectional view schematically showing a molding mold according to a second embodiment.

Next, a molding mold according to a second embodiment will be described with reference to the drawings. FIG. 12 is a cross-sectional view schematically showing a molding mold 240 according to the second embodiment. Hereinafter, in the molding mold 240 according to the second embodiment, members having the same functions as those of constituent members of the molding mold 40 according to the first embodiment described above are denoted by the same reference numerals, and detailed description thereof will be omitted.

As shown in FIG. 12, the molding mold 240 is different from the above-described molding mold 40 in that the molding mold 240 includes a first plasticized material portion 242 formed of a first plasticized material and a second plasticized material portion 244 formed of a second plasticized material.

A content of the amorphous metal in the second plasticized material is different from that in the first plasticized material. Therefore, the second plasticized material has thermal conductivity different from that of the first plasticized material. For example, the content of the amorphous metal in the second plasticized material is smaller than that in the first plasticized material. Therefore, the second plasticized material has thermal conductivity lower than that of the first plasticized material. In the second plasticized material, for example, the content of the amorphous metal may be zero. That is, the second plasticized material may not contain the amorphous metal.

As shown in FIG. 12, the cavity 140 of the molding mold 240 includes, for example, a first portion 140a, a second portion 140b, a third portion 140c, and a fourth portion 140d.

In the illustrated example, the first portion 140a is coupled to a flow path 2 through which the plasticized material from the nozzle 30 flows. The flow path 2 is provided in the fixed mold 42. The first portion 140a extends in the X axis direction. The second portion 140b and the third portion 140c are coupled to the first portion 140a. The second portion 140b and the third portion 140c extend from the first portion 140a in the +Y axis direction. The fourth portion 140d is coupled to the second portion 140b and the third portion 140c. The fourth portion 140d extends in the X axis direction.

When a molded product is molded, for example, the plasticized resin reaches the first portion 140a through the flow path 2, branches into the second portion 140b and the third portion 140c, and then merges at the fourth portion 140d, as indicated by arrows shown in FIG. 12.

The fourth portion 140d is in contact with the second plasticized material portion 244. The fourth portion 140d is not in contact with the first plasticized material portion 242. That is, the fourth portion 140d is defined by the second plasticized material portion 244. In the illustrated example, the first plasticized material and the second plasticized material are present separately at different layers. That is, the first plasticized material and the second plasticized material are not present in one layer 144. The layer 144 in which the first plasticized material is present and the layer 144 in which the second plasticized material is present are in contact with the cavity 140.

2.2. Method for Manufacturing Molding Mold

Next, a method for manufacturing the molding mold 240 according to the second embodiment will be described with reference to the drawings. Hereinafter, in the method for manufacturing the molding mold 240 according to the second embodiment, points different from the example of the method for manufacturing the molding mold 40 according to the first embodiment described above will be described, and description of the same points will be omitted.

The method for manufacturing the molding mold 240 includes a step of generating the second plasticized material by plasticizing a second shaping material. In the step of shaping the laminate 142, the first plasticized material and the second plasticized material are discharged to shape the laminate 142 in which the first plasticized material and the second plasticized material are present separately at different layers. In the example shown in FIG. 11, first, the second plasticized material portion 244 is formed by discharging the second plasticized material, and then the first plasticized material portion 242 is formed on the second plasticized material portion 244 by discharging the first plasticized material.

In the method for manufacturing the molding mold 240, for example, a three-dimensional shaping device having two shaping units 150 is used. In one shaping unit 150, the first shaping material is supplied to the material supply unit 152, the plasticizing unit 154 plasticizes the first shaping material to generate the first plasticized material, and the first plasticized material is discharged from the nozzle 156. In the other shaping unit 150, the second shaping material is supplied to the material supply unit 152, the plasticizing unit 154 plasticizes the second shaping material to generate the second plasticized material, and the second plasticized material is discharged from the nozzle 156.

2.3. Function and Effect

The method for manufacturing the molding mold 240 includes the step of generating the second plasticized material by plasticizing the second shaping material in which a content of the amorphous metal is different from that of the first shaping material. In the step of shaping the laminate 142, the first plasticized material and the second plasticized material are discharged to shape the laminate 142 in which the first plasticized material and the second plasticized material are present separately at different layers. Therefore, in the method for manufacturing the molding mold 240, the thermal conductivity of the laminate 142 can be controlled.

In the method for manufacturing the molding mold 240, the layer 144 in which the first plasticized material is present and the layer 144 in which the second plasticized material is present are in contact with the cavity 140. Therefore, in the method for manufacturing the molding mold 240, thermal conductivity of a portion of the laminate 142 which is in contact with the cavity 140 can be controlled.

For example, in the fourth portion of the cavity, since the plasticized resin merges, a weld line or a filling failure of the resin is likely to occur. On the other hand, in the molding mold 240, a portion in contact with the fourth portion 140d is formed of the second plasticized material, and therefore, thermal conductivity of the portion in contact with the fourth portion 140d is reduced. Accordingly, the resin flowing through the fourth portion 140d is less likely to be cooled, and a weld line and a filling failure of the resin are less likely to occur.

2.4. Modification of Molding Mold

Figure 13:
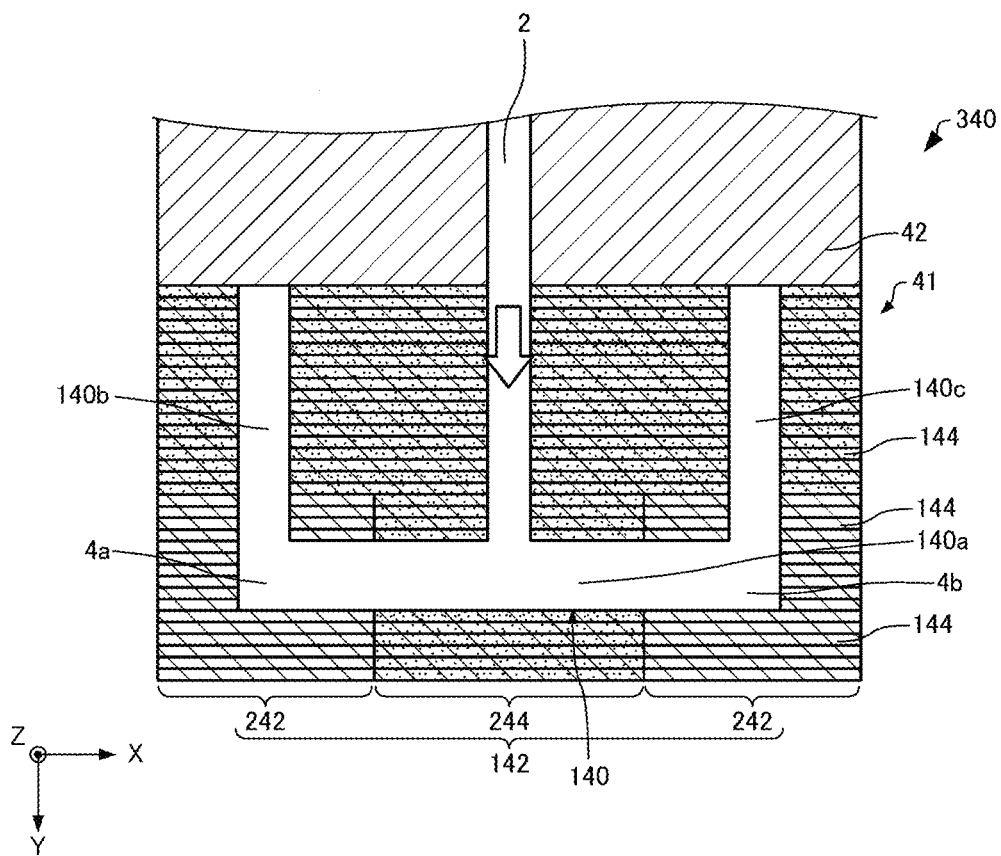
FIG. 13 is a cross-sectional view schematically showing a molding mold according to a modification of the second embodiment.

Next, a molding mold according to a modification of the second embodiment will be described with reference to the drawings. FIG. 13 is a cross-sectional view schematically showing a molding mold 340 according to the modification of the second embodiment. Hereinafter, in the molding mold 340 according to the modification of the second embodiment, members having the same functions as those of constituent members of the molding mold 240 according to the second embodiment described above are denoted by the same reference numerals, and detailed description thereof will be omitted.

In the molding mold 240 described above, as shown in FIG. 12, the cavity 140 has the fourth portion 140d coupled to the second portion 140b and the third portion 140c.

On the other hand, in the molding mold 340, as shown in FIG. 13, the cavity 140 does not have the fourth portion 140d. The second portion 140b and the third portion 140c extend from the first portion 140a in the −Y axis direction. When a molded product is molded, for example, the plasticized resin reaches the first portion 140a through the flow path 2, and branches into the second portion 140b and the third portion 140c, as indicated by an arrow shown in FIG. 13.

In the molding mold 340, in the illustrated example, a first corner portion 4a and a second corner portion 4b of the cavity 140 are in contact with the first plasticized material portion 242. The first corner portion 4a and the second corner portion 4b are defined by the first plasticized material portion 242. The first corner portion 4a is a coupling portion between the first portion 140a and the second portion 140b.

The second corner portion 4b is a coupling portion between the first portion 140a and the third portion 140c.

Heat is likely to accumulate at a corner portion of a cavity, and warpage is likely to occur in the molded product due to a temperature difference between the corner portion and a portion other than the corner portion. On the other hand, in the molding mold 340, portions in contact with the corner portions 4a and 4b are formed of the first plasticized material, and therefore, thermal conductivity of the portions in contact with the corner portions 4a and 4b is increased. Accordingly, a temperature difference between the corner portions 4a and 4b and the portion other than the corner portions 4a and 4b can be reduced, and warpage is less likely to occur in the molded product.

In the illustrated example, the first plasticized material and the second plasticized material are present in the same layer 144. That is, the first plasticized material and the second plasticized material are present in one layer 144. One layer 144 in which the first plasticized material and the second plasticized material are present is in contact with the cavity 140.

3. Experimental Example 3.1. Preparation of Sample

A shaping material containing an amorphous metal and a resin was plasticized to generate a plasticized material, and a laminate was shaped by discharging the plasticized material toward a stage to laminate a layer. For shaping the laminate, the three-dimensional shaping device as shown in FIG. 9 was used. Iron was used as the amorphous metal. PPS was used as the resin. A content of the amorphous metal in the shaping material was varied from 10 vol % to 40 vol %.

3.2. Condition for Measurement of Thermal Conductivity

Figure 14:
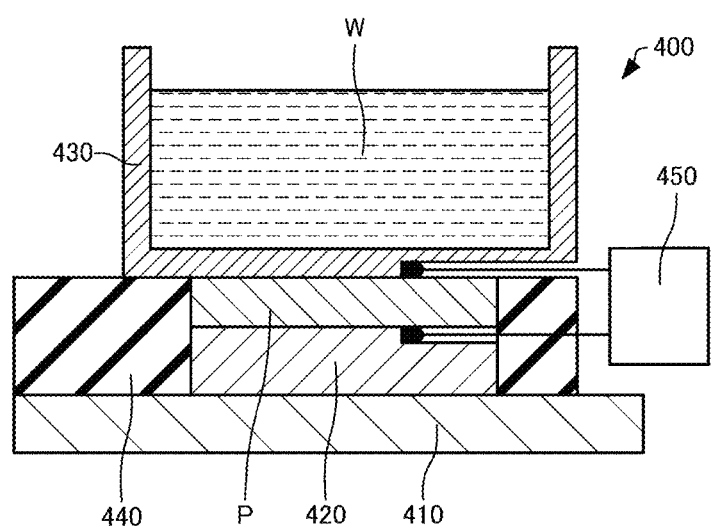
FIG. 14 is a cross-sectional view schematically showing a thermal conductivity measuring device for measuring thermal conductivity.
Figures 15, 16:
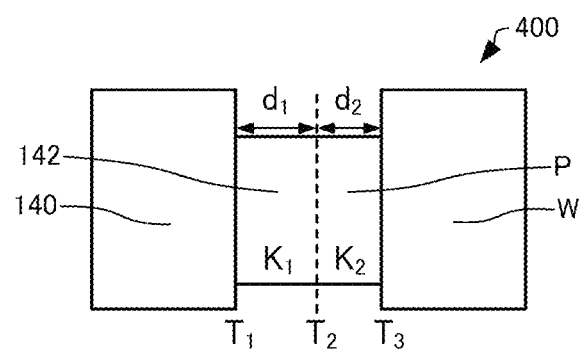
FIG. 15 is a diagram showing the thermal conductivity measuring device for measuring thermal conductivity.
FIG. 16 is a table showing measuring results of the thermal conductivity and an elastic modulus.

Thermal conductivity of the sample prepared as described above was measured. FIG. 14 is a cross-sectional view schematically showing a thermal conductivity measuring device 400 for measuring thermal conductivity. FIG. 15 is a diagram showing the thermal conductivity measuring device 400 for measuring the thermal conductivity. In FIG. 15, the thermal conductivity measuring device 400 is illustrated in a simplified manner.

As shown in FIGS. 14 and 15, a plate 420 whose thermal conductivity is known was disposed on a hot plate 410, and a sample P prepared as described above was disposed on the plate 420. A material of the plate 420 is steel use stainless (SUS) 304, and thermal conductivity thereof is 16.3 W/m·K. An aluminum box 430 containing water W was disposed on the sample P. A heat insulating material 440 made of styrene foam was disposed around the sample P and the plate 420. A temperature of the sample P was measured with a thermometer 450.

A size of the sample P and a size of the plate 420 were 50 mm in length, 70 mm in width, and 2 mm in thickness. A size of the aluminum box 430 was 100 mm in length, 100 mm in width, and 3 mm in thickness. An influence of an air layer on an interface was reduced by using a thermal compound.

By using the plate 420 whose thermal conductivity is known, thermal conductivity $K_2$ of the sample P can be obtained based on a relational formula in an equilibrium state of Q shown in the following Formula (2).

$$Q = K_1 \cdot S \cdot \frac{T_1 - T_2}{d_1} + 2\alpha \cdot S = K_2 \cdot S \cdot \frac{T_2 - T_3}{d_2} \quad (2)$$

(heat transfer amount of plate 420)=(heat transfer amount of sample P)

In Formula (2), Q is a heat transfer amount (W), K is thermal conductivity (W/m·K), S is a flat plate area (m²), T is a temperature (K), d is a thickness of plate (mm), and a is a correction term of lateral heat loss due to radiation and convection per unit area per unit thickness.

3.3. Condition for Measurement of Elastic Modulus

An elastic modulus of the sample was measured based on "JIS K7171". The sample was set in a plate shape having a length of 50 mm, a width of 10 mm, and a thickness of 4 mm. An elastic modulus of the sample in a direction parallel to the first direction and an elastic modulus of the sample in a direction perpendicular to the first direction were measured. The number of measurements was three for each direction. The elastic modulus was measured by a compression direction three-point bending test. A test speed was set to an indentation speed of 1 mm/min. The output was set to an elastic modulus in a region with a test force of from 10 N to 20 N.

3.4. Measuring Result

FIG. 16 is a table showing measuring results of the thermal conductivity and the elastic modulus. In FIG. 16, "Fe/PPS" containing an amorphous metal and PPS, "PPS" which is a simple substance of PPS not containing an amorphous metal, "NAK" which is a simple substance of a metal not containing PPS, and "CF/PPS" in which a carbon fiber is added as a filler to PPS are shown. The carbon fiber of "CF/PPS" was 30 mass %.

As shown in FIG. 16, it was found that the thermal conductivity and the elastic modulus in "Fe/PPS" can be controlled by adjusting a content of Fe which is the amorphous metal. The thermal conductivity and elastic modulus of "Fe/PPS" were higher than those of "PPS" and lower than those of "NAK".

Further, as shown in FIG. 16, a difference in elastic modulus between a parallel direction and a vertical direction of "Fe/PPS" was smaller than that of "CF/PPS", which is because the amorphous metal is spherical.

The above-described embodiments and modifications are merely examples, and the present disclosure is not limited thereto. For example, each embodiment and each modification can be appropriately combined.

The present disclosure includes a configuration substantially the same as the configuration described in the embodiments, for example, a configuration having the same function, method and result, or a configuration having the same object and effect. The present disclosure includes a configuration in which a non-essential portion of the configuration described in the embodiment is replaced. The present disclosure includes a configuration having the same function and effect as the configuration described in the embodiment, or a configuration capable of achieving the same object. The present disclosure includes a configuration in which a known technique is added to the configuration described in the embodiments.

The following contents are derived from the above embodiments.

An aspect of a method for manufacturing a molding mold is a method for manufacturing a molding mold used in an injection molding apparatus, and the method includes: generating a first plasticized material by plasticizing a first shaping material containing an amorphous metal and a resin; and shaping a laminate that is a part of the molding mold by discharging the first plasticized material toward a stage to laminate a layer.

According to the method for manufacturing a molding mold, a molding mold can be manufactured in which heat accumulated in the laminate is reduced, a cooling time of a molded product is shortened, and a filling failure and warpage are less likely to occur in the molded product.

In an aspect of the method for manufacturing a molding mold, the amorphous metal may be spherical.

According to the method for manufacturing a molding mold, as compared with when the amorphous metal is not spherical, it is possible to manufacture the laminate having a small elastic modulus difference in a first direction and a second direction orthogonal to each other.

In an aspect of the method for manufacturing a molding mold, a content of the amorphous metal in the first shaping material may be 1 vol % or more and 40 vol % or less.

According to the method for manufacturing a molding mold, the thermal conductivity of the laminate is set to be lower than thermal conductivity of the metal and higher than thermal conductivity of the resin, and the laminate can be easily shaped by the three-dimensional shaping device.

In an aspect of the method for manufacturing a molding mold, a main component of the amorphous metal may be iron, and a particle size of the amorphous metal may be 5 μm or more and 100 μm or less.

According to the method for manufacturing a molding mold, the possibility of the amorphous metal spilling off when the laminate is cut can be reduced while increasing the rigidity of the laminate.

In an aspect of the method for manufacturing a molding mold, in the generating of the first plasticized material, the first plasticized material may be generated using a flat screw.

According to the method for manufacturing a molding mold, as compared with when the first plasticized material is generated using an in-line screw, the device for manufacturing the laminate can be reduced in size.

In an aspect of the method for manufacturing a molding mold, in the shaping of the laminate, a laminate having a cavity may be shaped.

According to the method for manufacturing a molding mold, a cutting process can be simplified.

An aspect of the method for manufacturing a molding mold may further include: forming a cavity by cutting the laminate.

According to the method for manufacturing a molding mold, the shaping of the laminate can be simplified.

An aspect of the method for manufacturing a molding mold may further includes: generating a second plasticized material by plasticizing a second shaping material in which a content of the amorphous metal is different from that of the first shaping material, and in the shaping of the laminate, the first plasticized material and the second plasticized material may be discharged to shape a laminate in which the first plasticized material and the second plasticized material are present in the same layer, or a laminate in which the first plasticized material and the second plasticized material are present separately at different layers.

According to the method for manufacturing a molding mold, the thermal conductivity of the laminate can be controlled.

In an aspect of the method for manufacturing a molding mold, the same layer or the different layers may be in contact with the cavity.

According to the method for manufacturing a molding mold, thermal conductivity of a portion of the laminate in contact with the cavity can be controlled.

In an aspect of the method for manufacturing the molding mold, in the shaping of the laminate, a laminate having a cooling pipe may be shaped.

According to the method for manufacturing a molding mold, a cooling time of the molded product can be further shortened.

An aspect of a molding mold is a molding mold used in an injection molding apparatus, and the molding mold includes: a laminate containing an amorphous metal and a resin.

What is claimed is:

1. A method for manufacturing a molding mold used in an injection molding apparatus, the method comprising:
    generating a first plasticized material by plasticizing a first shaping material containing an amorphous metal and a resin; and
    shaping a laminate that is a part of the molding mold by discharging the first plasticized material toward a stage to laminate a layer,
    wherein the first shaping material is in pellet form and the amorphous metal is spherical, and
    wherein the shaping the laminate by discharging the first plasticized material includes discharging the first plasticized material toward a base plate provided on the stage to laminate the layer on the base plate, forming a cavity by cutting the laminate, and forming the mold by fitting the base plate on which the laminate is shaped into a recess provided in a master mold.

2. The method for manufacturing a molding mold according to claim 1, wherein
    a content of the amorphous metal in the first shaping material is 1 vol % or more and 40 vol % or less.

3. The method for manufacturing a molding mold according to claim 1, wherein
    a main component of the amorphous metal is iron, and
    a particle size of the amorphous metal is 5 μm or more and 100 μm or less.

4. The method for manufacturing a molding mold according to claim 1, wherein
    in the generating of the first plasticized material, the first plasticized material is generated using a flat screw.

5. The method for manufacturing a molding mold according to claim 1, further comprising:
    generating a second plasticized material by plasticizing a second shaping material in which a content of the amorphous metal is different from that of the first shaping material, wherein
    in the shaping of the laminate,
    the first plasticized material and the second plasticized material are discharged to shape a laminate in which the first plasticized material and the second plasticized material are present in the same layer, or a laminate in which the first plasticized material and the second plasticized material are present separately at different layers.

6. The method for manufacturing a molding mold according to claim 5, wherein
    the same layer or the different layers are in contact with the cavity.

7. The method for manufacturing a molding mold according to claim 1, wherein in the shaping of the laminate, a laminate having a cooling pipe is shaped.

8. The method for manufacturing a molding mold according to claim 1, wherein a thermal conductivity of the laminate is 0.20 W/mK or more and 10.0 W/mK or less.

9. The method for manufacturing a molding mold according to claim 1, wherein a thermal conductivity of the laminate is 0.30 W/mK or more and 0.80 W/mK or less.

10. The method for manufacturing a molding mold according to claim 1, wherein an elastic modulus difference ratio of the laminate is 80% or more and 120% or less, wherein the elastic modulus difference ratio of the laminate is calculated by the following formula (1), $$R = E1/E2 \times 100 \qquad (1)$$

where R represents the elastic modulus difference ratio, E1 represents an elastic modulus of the laminate in a direction perpendicular to a direction of stacking of the layer, E2 represents an elastic modulus of the laminate in the direction of stacking of the layer, and units of E1 and unit of E2 are the same.

11. The method for manufacturing a molding mold according to claim 1, wherein a content of the amorphous metal in the first shaping material is 1 vol % or more and 40 vol % or less, a thermal conductivity of the laminate is 0.20 W/mK or more and 10.0 W/mK or less, an elastic modulus difference ratio of the laminate is 80% or more and 120% or less, wherein the elastic modulus difference ratio of the laminate is calculated by the following formula (1), $$R = E1/E2 \times 100 \qquad (1)$$

where R represents the elastic modulus difference ratio, E1 represents an elastic modulus of the laminate in a direction perpendicular to a direction of stacking of the layer, E2 represents an elastic modulus of the laminate in the direction of stacking of the layer, and units of E1 and unit of E2 are same.

12. A method for manufacturing a molding mold used in an injection molding apparatus, the method comprising:

generating a first plasticized material by plasticizing a first shaping material containing an amorphous metal and a resin; and shaping a laminate that is a part of the molding mold by discharging the first plasticized material toward a stage to laminate a layer, wherein in the generating of the first plasticized material, the first plasticized material is generated using a plasticizing device having a screw and a barrel, the screw rotates around a rotational axis, and has a grooved surface on which a groove is formed, a length of the screw in a direction along the rotational axis is shorter than a length of the screw in a direction perpendicular to the rotational axis, and the barrel has a facing surface facing the grooved surface in the direction along the rotational axis.

13. A method for manufacturing a molding mold used in an injection molding apparatus, the method comprising:

generating a first plasticized material by plasticizing a first shaping material containing an amorphous metal and a resin; and shaping a laminate that is a part of the molding mold by discharging the first plasticized material toward a stage to laminate a layer, wherein in the generating of the first plasticized material, the first plasticized material is generated using a flat screw.

* * * * *